United States Patent [19]
Wieres

[11] Patent Number: 5,431,330
[45] Date of Patent: Jul. 11, 1995

[54] METHOD AND APPARATUS FOR APPLYING BRAZING MATERIAL TO A METAL HONEYCOMB BODY

[75] Inventor: Ludwig Wieres, Overath, Germany

[73] Assignee: Emitec Gesellschaft fuer Emissionstechnologie mbH, Lohmar, Germany

[21] Appl. No.: 314,160

[22] Filed: Sep. 28, 1994

[30] Foreign Application Priority Data

Jun. 11, 1992 [DE] Germany .................. 42 19 145.9

[51] Int. Cl.⁶ .............................................. B23K 37/04
[52] U.S. Cl. .................... 228/181; 228/248.1; 228/41
[58] Field of Search ............... 228/181, 183, 203, 244, 228/248.1, 41; 29/890

[56] References Cited

U.S. PATENT DOCUMENTS

| | | | |
|---|---|---|---|
| 3,722,071 | 3/1973 | Van Orsdel | 228/181 |
| 4,522,859 | 6/1985 | Blair | 228/181 |
| 5,082,167 | 1/1992 | Sadano et al. | 228/181 |

FOREIGN PATENT DOCUMENTS

| | | |
|---|---|---|
| 0049489 | 4/1982 | European Pat. Off. |
| 0136514 | 4/1985 | European Pat. Off. |
| 0474909 | 3/1992 | European Pat. Off. |
| 2302746 | 7/1974 | Germany |
| 2924592 | 1/1981 | Germany |
| 3818512 | 12/1989 | Germany |
| 3603882 | 2/1990 | Germany |
| 3726502 | 5/1990 | Germany |

*Primary Examiner*—Samuel M. Heinrich
*Attorney, Agent, or Firm*—Herbert L. Lerner; Laurence A. Greenberg

[57] ABSTRACT

A method for applying brazing material to an approximately metallic honeycomb body being wound, stratified or intertwined from at least partly structured sheet-metal layers, for brazing at least in partial regions, includes applying a thin film of a rolling oil to at least the structured sheet-metal layer, if such a film is not already present from production process; heat-treating the oil film to remove volatile components; placing regions of the sheet-metal layers to be provided with brazing material into contact with an aqueous solution of a surfactant; and putting the honeycomb bodies produced from the sheet-metal layers into contact with powdered brazing material adhering to locations where residues of the oil and the surfactant have come together. An apparatus for applying the brazing material to the honeycomb includes a heating station for passing a flow of hot air through a honeycomb body and heat-treating an oil film at a temperature of approximately 150° to 250° C. and preferably 200° to 230° C.; an application station for applying an aqueous solution of a surfactant onto at least one end surface of the honeycomb body with an absorbent material; a drying station for drying the honeycomb body in an airflow at approximately 100° to 160° C. and preferably 130° to 150° C.; and a brazing material application station for passing a flow of a gas through an accumulation of powdered brazing material from below to form a fluidized bed.

32 Claims, 4 Drawing Sheets

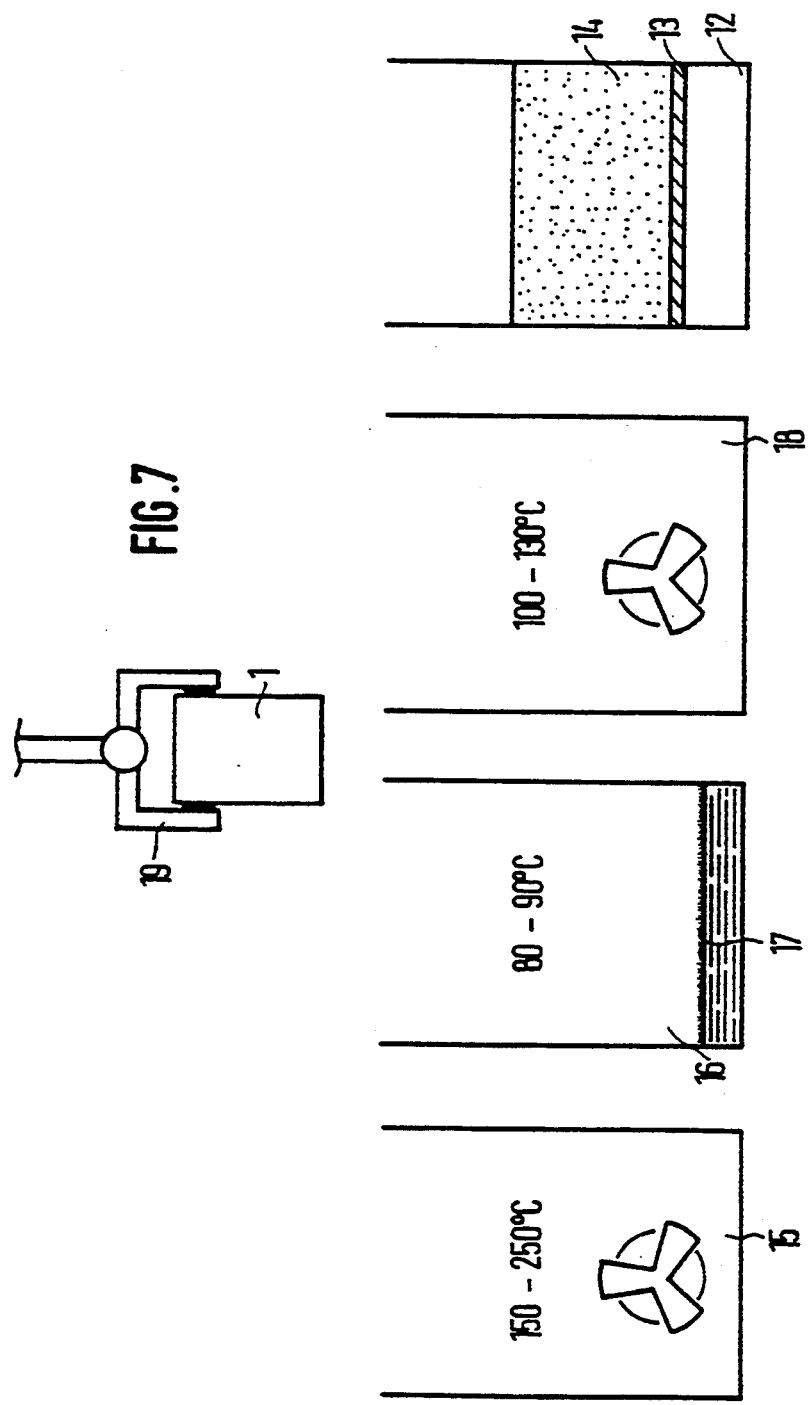

METHOD AND APPARATUS FOR APPLYING BRAZING MATERIAL TO A METAL HONEYCOMB BODY

CROSS-REFERENCE TO RELATED APPLICATION

This application is a Continuation of International Application Serial No. PCT/EP93/01380, filed Jun. 2, 1993.

BACKGROUND OF THE INVENTION

1. Field of the Invention

The present invention relates to a method for brazing a metallic honeycomb body, which is wound, laminated or intertwined from at least partly structured sheet-metal layers and which is to be brazed in at least some regions. The invention also relates to an apparatus for performing the method.

Metal honeycomb bodies are increasingly used as carrier bodies for catalytically active material in the exhaust systems of motor vehicles with internal combustion engines, for example. It is important for the durability of such catalyst carrier bodies as well as for the suitability of similar honeycomb bodies in another applications, that the individual sheet-metal layers which make up such bodies be joined together, at least in some regions, by high-quality brazed connections. Typically, such honeycomb bodies are of formed high-temperature-proof and corrosion-proof steel sheets and are vacuum-brazed at high temperature.

Such brazed honeycomb bodies are described, for instance, in German Published, Non-Prosecuted Applications DE 23 02 746 A, corresponding to British Patent No. 1,452,982; or German Published, Non-Prosecuted Applications DE 29 24 592 A, corresponding to U.S. Pat. No. 4,381,590. Those references already mention methods for applying brazing material, but such methods generally apply too much brazing material, so that on one hand the methods are not economical, and on the other hand the sheet properties are disadvantageously affected because the sheets tend to alloy with the brazing material.

Published European Application No. 0 049 489 B describes a method for applying glue and brazing material to such honeycomb bodies that already enables the application of only small quantities of brazing material. German Published, Non-Prosecuted Application DE 38 18 512 A, corresponding to U.S. application Ser. No. 621,068, filed Nov. 30, 1990, also describes methods for applying glue and brazing material to such carrier bodies and also includes an overview of the brazing application methods known at that time.

Methods used thus far have always included one problematic step at some point that led to difficulties in the production process or produced uneconomical results. In some methods, the sheets first had to be degreased by etching, which is labor-intensive and costly and requires disposal of the residues which are produced. The use of adhesives or pressure-sensitive adhesives also generally leads to the use of organic solubilizers, which once again necessitates additional provisions for environmental protection and is therefore uneconomical. Substances that evaporate in the vacuum furnace can also create difficulties in maintaining the vacuum.

SUMMARY OF THE INVENTION

It is accordingly an object of the invention to provide a method and an apparatus for applying brazing material to a metal honeycomb body, which overcome the hereinafore-mentioned disadvantages of the heretofore-known methods and devices of this general type, which create an especially simple process of brazing material application that makes do without chemical treatment of rolled sheets and without organic solubilizers and at the same time proceeds quickly, so that it can be used in mass production, and which create a suitable device for carrying out the method.

With the foregoing and other objects in view there is provided, in accordance with the invention, in a process of producing an approximately metallic honeycomb body being wound, stratified or intertwined from at least partly structured sheet-metal layers, for brazing at least in partial regions, a method for applying brazing material to the honeycomb body, which comprises applying a thin film of a rolling oil to at least the structured sheet-metal layer, if such a film is not already present from the production process; heat-treating the rolling oil film to remove highly volatile components; placing regions of the sheet-metal layers to be provided with brazing material into contact with an aqueous solution of a surfactant; and putting the honeycomb bodies produced from the sheet-metal layers into contact with powdered brazing material adhering to locations where residues of the rolling oil and the surfactant have come together.

One decisive step in the present invention is that an oil film which generally is already present from the process of rolling the sheets need not first be tediously removed completely, but instead can at least in part, after a heat treatment, already serve as a basis for the following process of applying brazing material. If not enough oil is present from the rolling process, or the oil that is present is not suitable, then although this rolling oil can be applied later, for instance before the metal sheets are structured, nevertheless it is naturally by far the most favorable to use a suitable oil directly in the rolling process, and to leave a thin film of it on the sheets during the entire process. In a heat treatment, highly volatile components are removed, and others are converted. Therefore, in accordance with another mode of the invention, there is provided a method which comprises applying the rolling oil while rolling the sheet-metal layers. However, residues of the rolling oil remain. If they are put into contact with a very highly diluted aqueous solution of a surfactant, then a film forms which, after the water is removed by drying, provides an optimal prerequisite for the application of powdered brazing material. This film shrinks back, particularly in the region of small gaps in the vicinity of the contact points to be brazed between the sheet-metal layers, and is not so sticky that powdered brazing material can remain stuck to it everywhere. It is only in the region of the narrow gaps in the vicinity of the points to be brazed that powdered brazing material can continue to stick. As will be explained in detail in conjunction with the drawings, this is precisely the prerequisite for optimal brazing material application. As a result, the method is also superior to a method for dry application of brazing material to honeycomb bodies as is described in Published European Application No. 0 136 514 B. The results are more replicable and can be attained with less expensive apparatus.

In accordance with a further mode of the invention, there is provided a method which comprises using a commercially available rolling oil that contains mineral substances, greases and process materials, which has proved to be a suitable oil.

In accordance with an added mode of the invention, there is provided a method which comprises producing the aqueous solution of a surfactant from a commercially available concentrate of approximately 15 to 30% nonionic surfactants, citric acid and solubilizers, in particular of the kind contained in dishwashing detergents, for instance. This concentrate is diluted by 85 to 97% and preferably 92 to 95% with water and can then be applied to the end surfaces of a honeycomb body at a carrier temperature of approximately 60° to 95° C. and preferably approximately 70° to 90° C., by means of a sponge-like device, and in particular by means of a low-pile velvet pillow.

In accordance with an additional mode of the invention, there is provided a method which comprises pretreating the rolling oil film on the honeycomb body at a temperature of approximately 150° to 250° C. and preferably approximately 200° to 230° C., and precisely controlling the process in such a way that the application of the aqueous solution of a surfactant takes place at a residual temperature of the honeycomb body of approximately 70° to 90° C. Next, for drying, the body is reheated to from 100° to 160° C. and preferably approximately 130° to 150° C., with the heating in each case preferably taking place in the air flow. Metal honeycomb bodies have a large surface and good heat conduction, so that fast heating times are possible and heating in the air flow presents no problems. In accordance with again another mode of the invention, there is provided a method which comprises subsequently applying brazing material to the honeycomb body by dipping the honeycomb body into an accumulation of powdered brazing material in a fluidized bed. Typically, nickel-based brazing materials are used, but this is not of decisive significance for the present invention.

In accordance with again a further mode of the invention, there is provided a method which comprises setting the grain size to be in the range from 1 to 200 m and preferably approximately 38 to 125 m, and having the grain sizes in the lower half of this range occur more frequently than those in the upper half. The reason that small grain sizes must be present in proportionately greater quantity is because they can penetrate deep into the gaps in the vicinity of the regions to be brazed, which is important for the quality of the brazing.

In accordance with again an added mode of the invention, there is provided a method which comprises promoting this penetration of the gaps by, for instance, also moving the honeycomb body back and forth or rotating it back and forth, or making it tumble in the fluidized bed. The important factor is that the movement be effected in such a way that the grains are forced into the existing gaps next to the regions to be brazed.

A commercially important aspect of the invention is that with the above-described brazing material application method, far less brazing material than in conventional methods is needed to produce high-quality brazing. Although the powdered brazing material becomes depleted of the smaller grain sizes over time because they remain caught in the gaps, nevertheless the remaining large-grained powdered brazing material can be replaced after some time and used for other purposes.

In accordance with again an additional mode of the invention, there is provided a method which comprises spraying on an adhesive substance, preferably isopropanol (CH3—CHOH—CHb 3), in order to prevent the powdered brazing material that only lightly adheres from dropping out of the honeycomb body again in the manipulation steps that follow the brazing material application.

In accordance with yet another mode of the invention, there is provided a method which comprises applying only approximately the following quantities of brazing material to an end surface of one honeycomb body: approximately 0.1 g per cm$^2$ for a honeycomb body with 100 cpsi, approximately 0.15 g per cm$^2$ for a honeycomb body with 400 cpsi, approximately 0.2 g per cm$^2$ for a honeycomb body with 600 cpsi.

With the objects of the invention in view, there is also provided an apparatus for applying brazing material to a metallic honeycomb body being wound, stratified, or intertwined from at least partly structured sheet-metal layers, for brazing at least in partial regions, comprising a heating station having means for passing a flow of hot air through a honeycomb body, and means for heat-treating an oil film at a temperature of approximately 150° to 250° C. and preferably between 200° and 230° C.; an application station having means for applying an aqueous solution of a surfactant onto at least one end surface of the honeycomb body with an absorbent material; a drying station having means for drying the honeycomb body in an airflow at approximately 100° to 160° C. and preferably between 130° and 150° C.; and a brazing material application station having means for passing a flow of a gas through an accumulation of powdered brazing material from below to form a fluidized bed.

In accordance with another feature of the invention, the absorbent material of the application station is a low-pile velvet cushion to be saturated with the aqueous solution of the surfactant.

In accordance with a concomitant feature of the invention, the brazing material application station has a container to be filled with the powdered brazing material, and the container has a false bottom being formed of a sintered metal plate through which compressed air or inert gas can flow from below.

Other features which are considered as characteristic for the invention are set forth in the appended claims.

Although the invention is illustrated and described herein as embodied in a method and an apparatus for applying brazing material to a metal honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a partially sectional and partially elevational view of a brazing material application apparatus.

DESCRIPTION OF THE PREFERRED EMBODIMENTS

Figure 1:
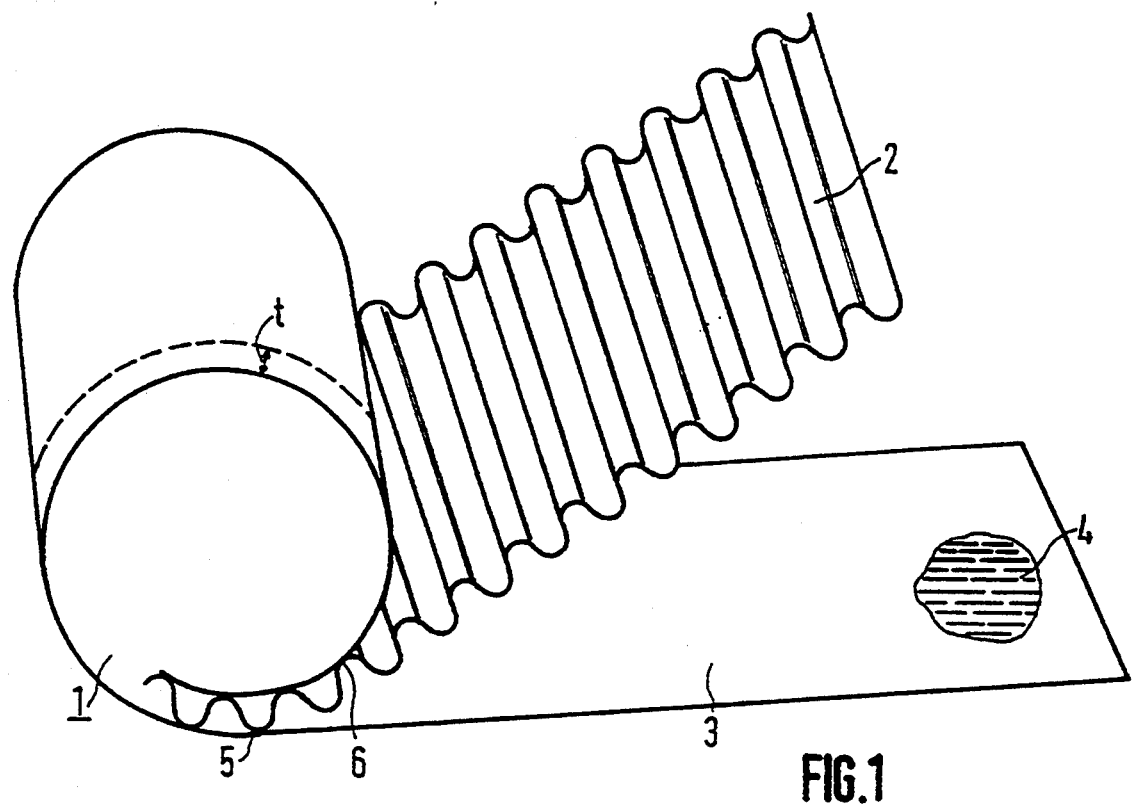
FIG. 1 is a diagrammatic, perspective view of an incompletely wound honeycomb body.

Referring now to the figures of the drawing in detail and first, particularly, to FIG. 1 thereof, there is seen a typical structure of a honeycomb body 1, of the kind that is especially used as an exhaust gas catalytic converter carrier body. A corrugated sheet-metal layer 2 and a smooth sheet-metal layer 3 are wound into a spiral body, producing typical contact points 5, 6 between the sheet-metal layers 2, 3. These contact points have a nip-like and wedge-like shape. The surface of the corrugated sheet-metal layer 2 and/or of the smooth sheet-metal layer 3 is covered with a film of rolling oil 4. The completely wound honeycomb body 1 is subjected to a heat treatment before being brought into contact up to a depth t on its end surface with an aqueous solution of a surfactant. The honeycomb body shown is representative of any type of wound, stratified, or otherwise assembled honeycomb bodies made of structured sheets, for which the present invention is equally applicable, such as in heat exchangers or the like.

Figure 2:
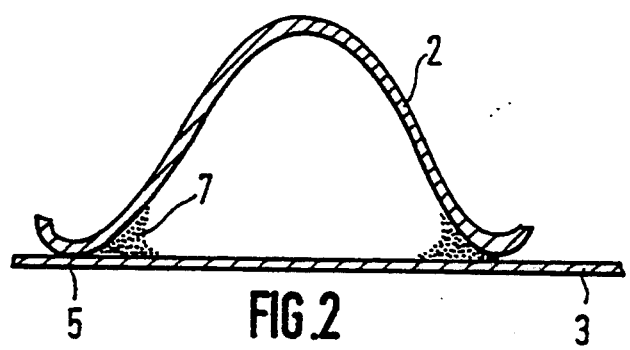
FIG. 2 is an enlarged, fragmentary, cross-sectional view of such a honeycomb body with brazing material applied correctly.
Figure 3:
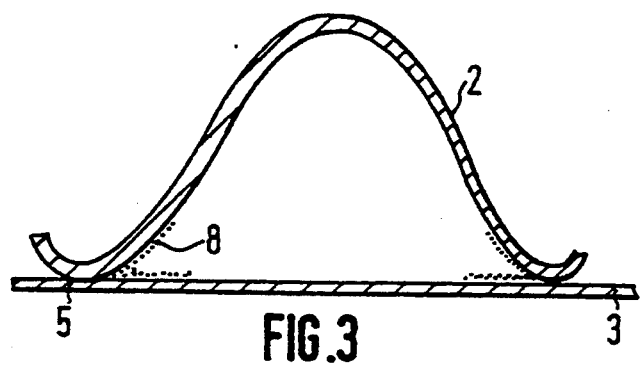
FIG. 3 is a view similar to FIG. 2 with an inadequate brazing material application.
Figure 4:
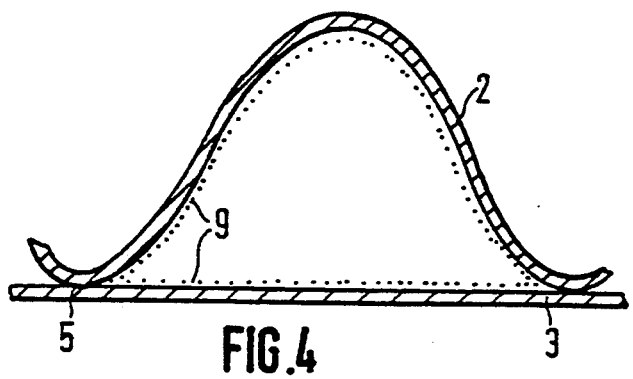
FIG. 4 is another view similar to FIGS. 2 and 3 with brazing material distributed incorrectly.

FIGS. 2, 3 and 4 show important factors concerning the method of the invention. The fragmentary views of a cross section through such a honeycomb body that are shown diagrammatically in the three figures show the typical contact points between a corrugated sheet-metal layer 2 and a smooth sheet-metal layer 3. Similar contact points occur with sheet-metal layers structured somewhat differently as well, particularly if the honeycomb body is made up of variously corrugated layers of sheet metal. FIG. 2 shows a correct accumulation of brazing material 7 in the region of the contact points, while FIG. 3 shows an overly small accumulation of brazing material 8, and FIG. 4 shows incorrectly distributed brazing material 9. Given correct drying, the combination according to the invention of a heat treatment of rolling oil and contact with the aqueous solution of a surfactant leads directly to a correct brazing material accumulation 7, while other methods lead to an overly small brazing material accumulation 8 and in particular to an incorrect brazing material distribution 9, as it typically looks if the end surfaces are provided with an adhesive or binder up to a certain depth t and brazing material is then applied. The brazing material application of FIG. 4 uses unnecessarily large quantities of brazing material without improving the quality of the brazed connections proportionately. In the present invention, the takeup of brazing material with end-surface application of brazing material to a honeycomb body is intended to be in the range of approximately 0.1 g/cm$^2$ of the end-surface area, for a honeycomb body with 100 cells per square inch (cpsi), approximately 0.15 g/cm$^2$ at 400 cpsi, and approximately 0.2 g/cm$^2$ at 600 cpsi. This is markedly less than can be attained with good brazing quality through the use of the brazing material application method known in the prior art.

Figure 5:
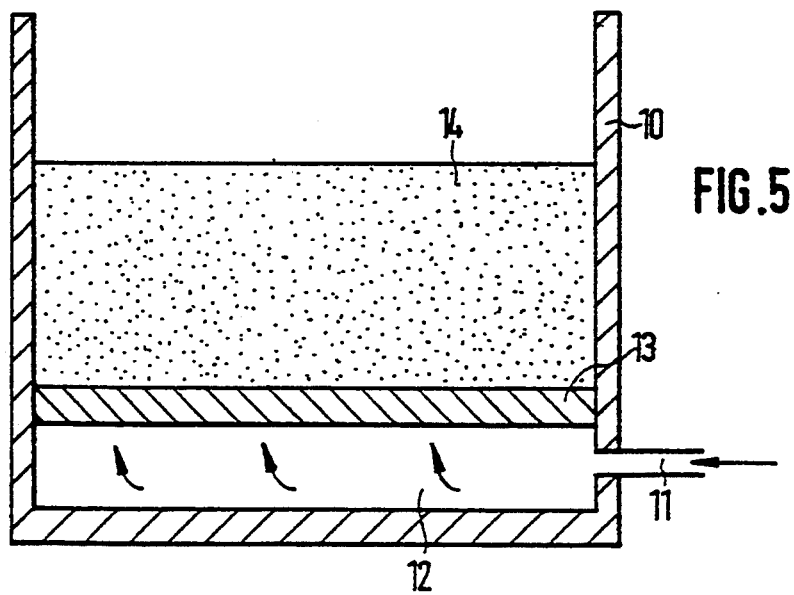
FIG. 5 is a sectional view of a container with a fluidized bed for powdered brazing material.

FIG. 5 shows a container 10 which has an inlet 11 in its lower region for dried air or a dry inert gas. This air is blown and finely distributed from a gas chamber 12 through a false bottom being formed of a sintered metal plate 13, into a powdered brazing material accumulation 14 and as a result forms a fluidized bed in which the brazing material grains virtually float and can very easily stick to a honeycomb body that is dipped into the fluidized bed.

Figure 6:
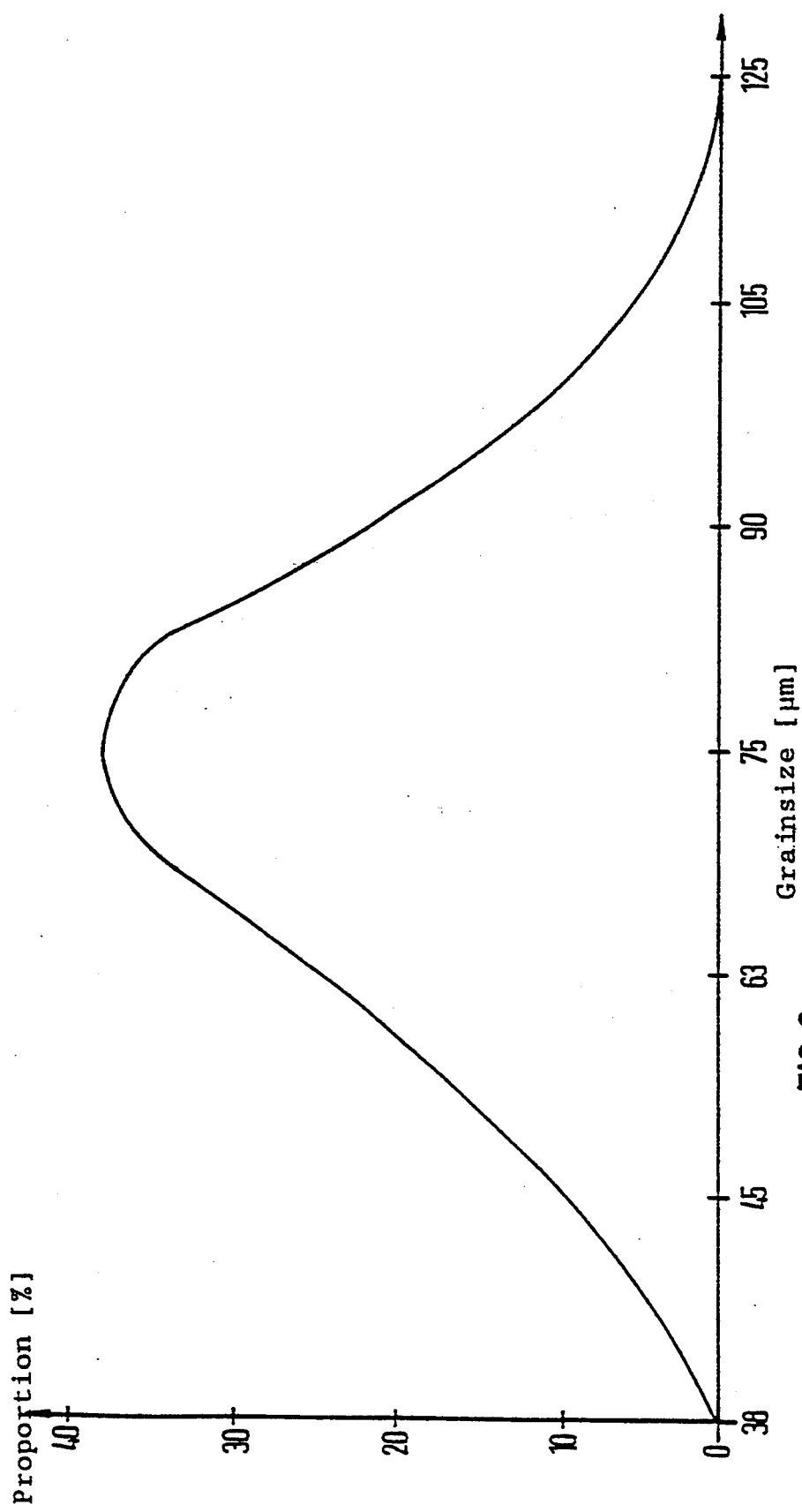
FIG. 6 is a diagram of a typical grain size distribution of the powdered brazing material used in the apparatus of FIG. 5, for applying brazing material to honeycomb bodies.

FIG. 6 shows a typical suitable distribution of the grain sizes of such a powdered brazing material. Nickel-based brazing materials are preferably used for exhaust gas catalytic converter carrier bodies. In the diagram, a proportion (in %) is plotted with respect to a grain size (in m). The scale of the X axis is not linear and the curve is not symmetrical, so that overall a predominant proportion of grain sizes exists between 38 and 75 m, which is important for a correct accumulation of brazing material as in FIG. 2.

FIG. 7 diagrammatically shows an exemplary embodiment of an apparatus according to the invention. A manipulator 19 serves to transport a honeycomb body 1 to various stations:

a heating station 15 for heat treating the rolling oil on the surface of the honeycomb body 1;

an application station 16, in which the aqueous solution of a surfactant is applied with an absorbent material, preferably a low-pile velvet pillow or cushion 17;

a drying station 18 for drying the applied coating; and a brazing material application station, with an accumulation of the powdered brazing material 14 through which gas flows from the chamber 12 below and which forms a fluidized bed above the sintered metal plate 13.

The present invention is suitable for economical application of brazing material to metal honeycomb bodies on a large scale and results in a thrifty use of brazing material, while the quality of the brazing remains equally high. Its special field of application is the production of metal carriers for exhaust gas catalytic converters in motor vehicles.

I claim:

1. In a process of producing an essentially metallic honeycomb body being wound, stratified or intertwined from at least partly structured sheet-metal layers, for brazing at least in partial regions, a method for applying brazing material to the honeycomb body, which comprises:

a) applying a thin film of a rolling oil to at least the structured sheet-metal layer, if such a film is not already present;

b) heat-treating the rolling oil film to remove volatile components;

c) placing regions of the sheet-metal layers to be provided with brazing material into contact with an aqueous solution of a surfactant; and d) putting the honeycomb bodies produced from the sheet-metal layers into contact with powdered brazing material adhering to locations where residues of the rolling oil and the surfactant have come together.

2. The method according to claim 1, which comprises applying the rolling oil while rolling the sheet-metal layers.

3. The method according to claim 1, which comprises forming the rolling oil from mineral oils, greases, and process materials.

4. The method according to claim 1, which comprises diluting a concentrate containing approximately 15 to 30% nonionic surfactants, citric acid and solubilizers, with approximately 85 to 97% water, and then putting the diluted concentrate in contact with the regions to which brazing material is to be applied.

5. The method according to claim 1, which comprises diluting a concentrate containing approximately 15 to 30% nonionic surfactants, citric acid and solubilizers, with approximately 92 to 95% water, and then putting the diluted concentrate in contact with the regions to which brazing material is to be applied.

6. The method according to claim 1, which comprises applying the aqueous solution of the surfactant by saturating a low-pile velvet pillow with the aqueous solution and pressing the pillow against end surfaces of the honeycomb body.

7. The method according to claim 1, which comprises carrying out the step of heat-treating the rolling oil at a temperature of approximately 150° to 250° C.

8. The method according to claim 1, which comprises carrying out the step of heat-treating the rolling oil at a temperature of approximately 200° to 230° C.

9. The method according to claim 1, which comprises putting the honeycomb body in contact with the aqueous solution of the surfactant, at a temperature of the honeycomb body of approximately 60° to 95° C.

10. The method according to claim 1, which comprises putting the honeycomb body in contact with the aqueous solution of the surfactant, at a temperature of the honeycomb body of approximately 70° to 90° C.

11. The method according to claim 1, which comprises drying the honeycomb body at approximately 100° to 160° C., after putting the honeycomb body into contact with the aqueous solution of the surfactant.

12. The method according to claim 1, which comprises drying the honeycomb body at approximately 130° to 150° C., after putting the honeycomb body into contact with the aqueous solution of the surfactant.

13. The method according to claim 1, which comprises contacting the honeycomb body with the aqueous solution of the surfactant by means of a flow of hot air, and then carrying out the step of heat-treating the rolling oil film.

14. The method according to claim 11, which comprises contacting the honeycomb body with the aqueous solution of the surfactant by means of a flow of hot air, and then carrying out the step of heat-treating the rolling oil film.

15. The method according to claim 11, which comprises contacting the honeycomb body with the aqueous solution of the surfactant by means of a flow of hot air, and then carrying out the step of drying.

16. The method according to claim 11, which comprises contacting the honeycomb body with the aqueous solution of the surfactant by means of a flow of hot air, and then carrying out the steps of heat-treating the rolling oil film and drying.

17. The method according to claim 1, which comprises plunging an end surface of the honeycomb body into a fluidized bed of the powdered brazing material, for bringing regions in which the residues of the rolling oil and the aqueous solution of the surfactant have been put into contact with one another, into contact with the powdered brazing material.

18. The method according to claim 17, which comprises forming the fluidized bed from an accumulation of fine-grained powdered brazing material being fluidized from below by means of a dry gas.

19. The method according to claim 17, which comprises forming the fluidized bed from an accumulation of fine-grained powdered brazing material being fluidized from below by means of a dry inert gas.

20. The method according to claim 18, which comprises forming the fine-grained powdered brazing material with grain sizes in a range between 1 and 200 m, and with the grain sizes in a lower half of the range occurring more frequently than the grain sizes in an upper half of the range.

21. The method according to claim 18, which comprises forming the fine-grained powdered brazing material with grain sizes in a range between between 38 and 125 m, and with the grain sizes in a lower half of the range occurring more frequently than the grain sizes in an upper half of the range.

22. The method according to claim 17, which comprises moving the honeycomb body back and forth in the fluidized bed for pressing the powdered brazing material into gaps near locations to be brazed.

23. The method according to claim 18, which comprises moving the honeycomb body back and forth in the fluidized bed for pressing the powdered brazing material into gaps near locations to be brazed.

24. The method according to claim 20, which comprises moving the honeycomb body back and forth in the fluidized bed for pressing the powdered brazing material into gaps near locations to be brazed.

25. The method according to claim 1, which comprises spraying on a film of an adhesive substance, for securing the applied powdered brazing material from falling out during further processing.

26. The method according to claim 1, which comprises spraying on a film of isopropanol, for securing the applied powdered brazing material from falling out during further processing.

27. The method according to claim 1, which comprises applying only approximately the following quantities of brazing material to an end surface of one honeycomb body:
   approximately 0.1 g per $cm^2$ for a honeycomb body with 100 cpsi,
   approximately 0.15 g per $cm^2$ for a honeycomb body with 400 cpsi,
   approximately 0.2 g per $cm^2$ for a honeycomb body with 600 cpsi.

28. An apparatus for applying brazing material to a metallic honeycomb body being wound, stratified, or intertwined from at least partly structured sheet-metal layers, for brazing at least in partial regions, comprising:
   a) a heating station having means for thermal treatment of a honeycomb body with hot air at a temperature of approximately 150° to 250° C.;
   b) an application station having means for applying an aqueous solution of a surfactant onto at least one end surface of the honeycomb body with an absorbent material;
   c) a drying station having means for drying the honeycomb body in an airflow at approximately 100° to 160° C.; and
   d) a brazing material application station having means for passing a flow of a gas through an accumulation of powdered brazing material from below to form a fluidized bed.

29. The apparatus according to claim 28, wherein said means for thermal treatment of the honeycomb body with hot air carry out the thermal treatment at between 200° and 230° C., and said means for drying the honeycomb body in an airflow carry out the drying at between 130° and 150° C.

30. The apparatus according to claim 28, wherein said absorbent material of said application station is a low-pile velvet cushion to be saturated with the aqueous solution of the surfactant.

31. The apparatus according to claim 30, wherein said brazing material application station has a container to be filled with the powdered brazing material, and said container has a false bottom being formed of a sintered metal plate through which compressed air or inert gas can flow from below.

32. The apparatus according to claim 28, wherein said means for thermal treatment of the honeycomb body with hot air are means for passing a flow of hot air through the honeycomb body.

* * * * *